United States Patent
Ghabra et al.

(10) Patent No.: US 6,906,612 B2
(45) Date of Patent: Jun. 14, 2005

(54) SYSTEM AND METHOD FOR VEHICLE PASSIVE ENTRY HAVING INSIDE/OUTSIDE DETECTION

(75) Inventors: Riad Ghabra, Dearborn Heights, MI (US); John S. Nantz, Brighton, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 313 days.

(21) Appl. No.: 10/120,724

(22) Filed: Apr. 11, 2002

(65) Prior Publication Data

US 2003/0193388 A1 Oct. 16, 2003

(51) Int. Cl.$^7$ .............................................. G08C 19/00
(52) U.S. Cl. .................................... 340/5.61; 340/5.72
(58) Field of Search .............................. 340/5.61, 5.62, 340/5.63, 5.72, 825.69, 426.16, 539.21; 342/457, 126

(56) References Cited

U.S. PATENT DOCUMENTS

| | | |
|---|---|---|
| 2,069,860 A | 2/1937 | Stewart |
| 4,064,458 A | 12/1977 | DeLoach, Jr. |
| 4,361,202 A | 11/1982 | Minovitch |
| 4,477,874 A | 10/1984 | Ikuta et al. |
| 4,638,292 A | 1/1987 | Mochida et al. |
| 4,665,395 A | 5/1987 | VanNess |
| 4,670,746 A | 6/1987 | Taniguchi et al. |
| 4,868,885 A * | 9/1989 | Perry ........................... 455/10 |
| 4,873,530 A | 10/1989 | Takeuchi et al. |
| 4,942,393 A | 7/1990 | Waraksa et al. |
| 5,134,392 A | 7/1992 | Takeuchi et al. |
| 5,204,672 A | 4/1993 | Brooks |
| 5,432,495 A | 7/1995 | Tompkins |
| 5,463,374 A | 10/1995 | Mendez et al. |
| 5,499,022 A | 3/1996 | Boschini |
| 5,525,977 A | 6/1996 | Suman |
| 5,596,316 A | 1/1997 | Honeck |
| 5,602,426 A | 2/1997 | Ecker |
| 5,602,535 A | 2/1997 | Boyles et al. |
| 5,648,764 A | 7/1997 | Nose et al. |
| 5,661,651 A | 8/1997 | Geschke et al. |
| 5,710,548 A * | 1/1998 | LeMense ................ 340/825.69 |
| 5,722,058 A | 2/1998 | Umemoto et al. |
| 5,748,101 A | 5/1998 | Christensen et al. |
| 5,751,073 A | 5/1998 | Ross |
| 5,801,372 A | 9/1998 | Yamaguchi |

(Continued)

FOREIGN PATENT DOCUMENTS

| | | |
|---|---|---|
| EP | 1 101 887 A2 | 5/2001 |
| JP | 7-109859 | 4/1995 |
| JP | 407109859 A | 4/1995 |
| JP | 10-176447 | 6/1998 |
| JP | 410176447 A | 6/1998 |

*Primary Examiner*—Edwin C. Holloway, III
(74) *Attorney, Agent, or Firm*—Bill C. Panagos

(57) ABSTRACT

In a vehicle passive entry system including a remote transceiver, a system and method for detecting the location of the remote transceiver relative to the vehicle. An exterior vehicle antenna is provided for use in transmitting a first signal for receipt by the remote transceiver, and an interior vehicle antenna is provided for use in transmitting a second signal for receipt by the remote transceiver. A controller is provided on board the remote transceiver for determining a signal strength of the first signal, determining a signal strength of the second signal, and determining whether the remote transceiver is located inside or outside the vehicle based on the signal strengths of the first and second signals.

16 Claims, 1 Drawing Sheet

U.S. PATENT DOCUMENTS

| | | |
|---|---|---|
| 5,883,443 A | 3/1999 | Wilson |
| 5,905,431 A | 5/1999 | Mueller et al. |
| 5,949,349 A | 9/1999 | Farris et al. |
| 5,952,937 A | 9/1999 | Koopman, Jr. et al. |
| 5,963,128 A | 10/1999 | McClelland |
| 5,973,611 A | 10/1999 | Kulha et al. |
| 5,986,548 A | 11/1999 | McGregor |
| 6,002,332 A | 12/1999 | King |
| 6,049,268 A | 4/2000 | Flick |
| 6,087,987 A * | 7/2000 | Bachhuber et al. .......... 342/457 |
| 6,094,131 A | 7/2000 | Chen et al. |
| 6,130,622 A | 10/2000 | Hussey et al. |
| 6,140,914 A | 10/2000 | Mueller et al. |
| 6,232,875 B1 | 5/2001 | DeZorzi |
| 6,236,333 B1 | 5/2001 | King |
| 6,243,007 B1 | 6/2001 | McLaughlin et al. |
| 6,243,022 B1 | 6/2001 | Furukawa |
| 6,259,362 B1 | 7/2001 | Lin |
| 6,624,741 B1 * | 9/2003 | Dais et al. .................. 340/5.72 |
| 2001/0005170 A1 * | 6/2001 | Heide et al. ................ 340/5.61 |

\* cited by examiner

SYSTEM AND METHOD FOR VEHICLE PASSIVE ENTRY HAVING INSIDE/OUTSIDE DETECTION

BACKGROUND OF THE INVENTION

1. Field of the Invention

The present invention relates to a passive entry system for a motor vehicle having a remote keyless access device and interior and exterior vehicle antenna for use in detecting a location of the remote keyless access device.

2. Background

It is well known in the automotive industry to provide for remote vehicle access, such as through the use of remote keyless entry (RKE) systems. Such RKE systems use a remote hand held transmitter, which is commonly referred to as a "fob." Currently available RKE fobs may be separate units, or may be part of an ignition key head. Such RKE fobs generally transmit radio frequency (RF) signals to a vehicle in order to lock or unlock vehicle doors, open or close a vehicle sliding door, unlock a vehicle trunk, activate internal and/or external vehicle lights, activate a "panic" alarm, and/or perform a variety of other functions.

In that regard, such RKE systems also typically include a receiver and/or control unit installed in the vehicle. The receiver and/or control unit may be provided in communication with door locking mechanisms to lock and unlock the vehicle doors in response to lock or unlock signals received from the remote transmitter within some pre-defined range. Similarly, the receiver and/or control unit may be provided in communication with other vehicle devices to control operation thereof in response to other signals received from the remote transmitter.

The RKE systems of the types described above may be characterized as active in nature, where a switch or pushbutton on the remote transmitter must be activated by an operator in order to have a desired remote access function performed, such as locking or unlocking the vehicle doors. Alternatively, RKE systems may also be passive in nature, where no such switch or pushbutton activation by an operator is required in order to perform a desired remote access function.

In that regard, in a passive keyless entry system, a remote transceiver, which may be referred to as a "fob" or a "card," is typically provided for communicating with a transceiver and/or control unit installed in the vehicle. The vehicle transceiver and/or control unit is again provided in communication with door locking mechanisms to lock and unlock the vehicle doors in response to lock or unlock signals received from the remote transceiver within some pre-defined range.

In such passive entry systems, however, the remote transceiver carried by an operator is designed to automatically unlock the vehicle as the operator approaches the vehicle, without the need for operation of any switch or pushbutton by the operator. Similarly, the system is further designed to automatically lock the vehicle as the operator, carrying the remote transceiver, moves away from the vehicle.

Exemplary passive entry systems for vehicles are described in U.S. Pat. No. 4,873,530 issued to Takeuchi et al. and entitled "Antenna Device In Automotive Keyless Entry System;" U.S. Pat. No. 4,942,393 issued to Waraksa et al. and entitled "Passive Keyless Entry System;" U.S. Pat. No. 5,499,022 issued to Boschini and entitled "Remote Control System For Locking And Unlocking Doors And Other Openings In A Passenger Space, In Particular In A Motor Vehicle;" U.S. Pat. No. 5,751,073 issued to Ross and entitled "Vehicle Passive Keyless Entry And Passive Engine Starting System;" U.S. Pat. No. 6,049,268 issued to Flick and entitled "Vehicle Remote Control System With Less Intrusive Audible Signals And Associated Methods;" and U.S. Pat. No. 6,236,333 issued to King and entitled "Passive Remote Keyless Entry System."

However, as is well known to those of ordinary skill in the art, a feature that must be provided in any passive entry system in order for the system to be viable is detecting whether the remote transceiver is inside or outside of the vehicle. In that regard, there are may be several antenna used in a vehicle passive entry system, both inside and outside of the vehicle. The function of the inside antenna is to detect if the remote transceiver is inside the vehicle. It is, however, challenging and costly to prevent electromagnetic fields from the inside antenna from exiting the vehicle, and to prevent electromagnetic fields from the outside antenna from entering the vehicle.

Thus, there exists a need for an improved passive entry system and method that uses inside and outside antenna to detect the location of the remote transceiver. In such a system and method, the remote transceiver would preferably compare the signal strength of signals from the interior and exterior antenna to determine whether the remote transceiver is inside or outside of the vehicle.

SUMMARY OF THE INVENTION

Accordingly, the present invention provides an improved passive entry system and method that uses inside and outside antenna to detect the location of the remote transceiver, preferably by comparing the signal strength of signals from the interior and exterior antenna to determine whether the remote transceiver is inside or outside of the vehicle.

According to the preferred embodiment of the present invention, in a passive entry system for a vehicle, the passive entry system including a remote transceiver, a system is provided for detecting a location of the remote transceiver relative to the vehicle. The system comprises an exterior vehicle antenna for use in transmitting a first signal for receipt by the remote transceiver, and an interior vehicle antenna for use in transmitting a second signal for receipt by the remote transceiver. The system further comprises a controller on board the remote transceiver for determining a signal strength of the first signal, determining a signal strength of the second signal, and determining whether the remote transceiver is located inside or outside the vehicle based on the signal strengths of the first and second signals a remote access device is provided comprising.

Also according to the present invention, in a passive entry system for a vehicle, the passive entry system including a remote transceiver, a method is provided for detecting a location of the remote transceiver relative to the vehicle. The method comprises providing an exterior vehicle antenna for use in transmitting a first signal for receipt by the remote transceiver, and providing an interior vehicle antenna for use in transmitting a second signal for receipt by the remote transceiver. The method further comprises providing a controller on board the remote transceiver for determining a signal strength of the first signal, determining a signal strength of the second signal, and determining whether the remote transceiver is located inside or outside the vehicle based on the signal strengths of the first and second signals.

The above features, and other features and advantages of the present invention are readily apparent from the following

BEST MODE FOR CARRYING OUT THE INVENTION

Figure 1:
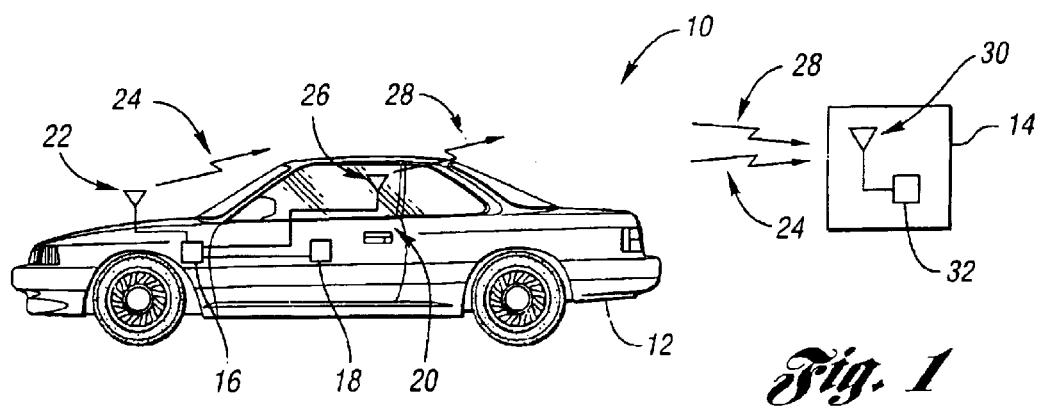
FIG. 1 is a simplified, exemplary block diagram depicting the improved passive entry system of the present invention including inside/outside detection.

Referring now to Figures, the preferred embodiments of the present invention will now be described. As previously noted, it is well known in the automotive industry to provide for remote vehicle access, such as through the use of RKE systems. Such RKE systems use a remote hand held transmitter, commonly referred to as a "fob," which may be a separate unit, or may be part of an ignition key head. Such RKE fobs generally transmit RF signals to a vehicle in order to lock or unlock vehicle doors, open or close a vehicle sliding door, unlock a vehicle trunk, activate internal and/or external vehicle lights, activate a "panic" alarm, and/or perform a variety of other functions In that regard, such RKE systems also typically include a receiver and/or control unit installed in the vehicle. The receiver and/or control unit may be provided in communication with door locking mechanisms to lock and unlock the vehicle doors in response to lock or unlock signals received from the remote transmitter within some pre-defined range. Similarly, the receiver and/or control unit may be provided in communication with other vehicle devices to control operation thereof in response to other signals received from the remote transmitter.

As also previously noted, the RKE systems of the types described above may be characterized as active in nature, where a switch or pushbutton on the remote transmitter must be activated by an operator in order to have a desired remote access function performed, such as locking or unlocking the vehicle doors. Alternatively, RKE systems may also be passive in nature, where no such switch or pushbutton activation by an operator is required in order to perform a desired remote access function.

As described above, in a passive keyless entry system, a remote transceiver is typically provided for communicating with a transceiver and/or control unit installed in the vehicle. The vehicle transceiver and/or control unit is again provided in communication with door locking mechanisms to lock and unlock the vehicle doors in response to lock or unlock signals received from the remote transceiver within some pre-defined range.

As noted above, in such passive entry systems, the remote transceiver carried by an operator is designed to automatically unlock the vehicle as the operator approaches the vehicle, without the need for operation of any switch or pushbutton by the operator. Similarly, the system is further designed to automatically lock the vehicle as the operator, carrying the remote transceiver, moves away from the vehicle.

As also described above, it is well known to those of ordinary skill in the art that, to be viable, any passive entry system must be able to detect whether the remote transceiver is inside or outside of the vehicle. In that regard, there may be several antenna used in a vehicle passive entry system, both inside and outside of the vehicle. The function of the inside antenna is to detect if the remote transceiver is inside the vehicle. It is, however, challenging and costly to prevent electromagnetic fields from the inside antenna from exiting the vehicle, and to prevent electromagnetic fields from the outside antenna from entering the vehicle.

Thus, there exists a need for an improved passive entry system and method that uses inside and outside antenna to detect the location of the remote transceiver. In such a system and method, the remote transceiver would preferably compare the signal strength of signals from the interior and exterior antenna to determine whether the remote transceiver is inside or outside of the vehicle.

Referring now more particularly to FIG. 1, a simplified, exemplary block diagram depicting the improved passive entry system of the present invention including inside/outside detection is shown, denoted generally by reference numeral 10. As seen therein, the system (10) is provided for use in a passive entry system for use in a vehicle (12).

In that regard, the passive entry system includes a remote transceiver (14). Remote transceiver (14) is provided for communicating with a transceiver and/or control unit (16) installed in the vehicle (12). The vehicle transceiver and/or control unit (16) is itself provided in communication with a door locking mechanism (18) to lock and unlock a vehicle door (20) in response to transmitted lock or unlock signals received by vehicle transceiver and/or control unit (16) from the remote transceiver (14) within some pre-defined range.

In that regard, in a fashion well known in the art, the remote transceiver (14) is carried by an operator (not shown), and is designed to automatically unlock the vehicle door (20) as the operator approaches the vehicle (12), without the need for operation of any switch or pushbutton by the operator on the remote transceiver (14). Similarly, the system is further designed, in a fashion well known in the art, to automatically lock the vehicle door (20) as the operator, carrying the remote transceiver (14), moves away from the vehicle (12).

As previously noted, and as is well known to those of ordinary skill in the art, to be viable, the passive entry system must detect whether the remote transceiver (14) is inside or outside of the vehicle (12). In that regard, referring still to FIG. 1, the system (10) of the present invention also includes at least one exterior vehicle antenna (22). While, in FIG. 1, a single exterior antenna (22) is shown, multiple exterior antennas could be used. Exterior vehicle antenna (22) is provided for use in transmitting a first signal (24) for receipt by the remote transceiver (14) for use in determining the location of the remote transceiver (14) relative to the vehicle (12).

The system (10) still further includes an interior vehicle antenna (26) for use in transmitting a second signal (28) for receipt by the remote transceiver (14), and also for use in determining the location of the remote transceiver (14) relative to the vehicle (12). Once again, while, in FIG. 1, a single interior antenna (26) is shown, multiple interior antennas could be used. In addition, exterior and interior antenna (22, 26) may take any form known in the art, and are each depicted in FIG. 1 in a simplified fashion as a coil for ease of illustration only.

It should also be noted that, as used herein, the terms "interior" antenna and "exterior" antenna refer to the general location of an electromagnetic field generated by such antenna, rather than the physical location of the antenna. Thus, exterior antenna (22) could be located, for example, in a vehicle door, such as door (20), and need not be located on the exterior of the vehicle (12). In that same regard, exterior antenna (22) is provided to transmit first signal (24) generally outside vehicle (12), while interior antenna (26) is provided to transmit second signal (28) generally inside vehicle (12).

Still referring to FIG. 1, remote transceiver (14) is preferably provided with a controller (32) for determining a signal strength of the first signal (24), and determining a signal strength of the second signal (28). Based on the determined signals strengths of the first and second signals (24, 28), the controller (32) also determines whether the remote transceiver (14) is located inside or outside the vehicle (12).

Figure 2:
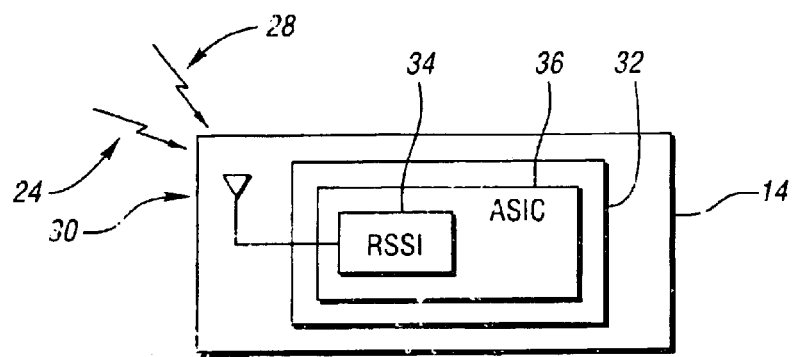
FIG. 2 is a simplified, exemplary block diagram depicting the remote transceiver for use in the improved passive entry system and method of the present invention.

Referring next to FIG. 2, a simplified, exemplary block diagram depicting the remote transceiver (14) for use in the improved passive entry system and method of the present invention is shown. As seen therein, remote transceiver (14) includes an antenna (30) and controller (32). Antenna (30) is provided for receiving first and second signals (24, 28) from interior and exterior antenna (22, 26), and providing first and second signals (24, 28) to controller (32).

Still referring to FIG. 2, controller (32) preferably includes a Received Signal Strength Indicator (RSSI) (34). Using RSSI (34), controller (32) is capable of determining a signal strength of the first signal (24) received from antenna (30), and determining a signal strength of the second signal (28) received from antenna (30).

In that regard, RSSI (34) is preferably provided as part of an Application Specific Integrated Circuit (ASIC) (36). Preferably, the signal strengths of first and second signals (24, 28) determined by RSSI (34) are compared by ASIC (36) in order to determine if the remote transceiver (14) is inside or outside the vehicle (12).

More particularly, if the strength of first signal (24) from exterior vehicle antenna (22) is greater than the strength of second signal (28) from interior vehicle antenna (26), because such a situation is an indication that remote transceiver (14) is closer to exterior vehicle antenna (22) than to interior vehicle antenna (26), it is therefore determined that the remote transceiver (14) is outside or external to the vehicle (12). Alternatively, if the strength of second signal (28) from interior vehicle antenna (26) is greater than the strength of first signal (24) from exterior vehicle antenna (22), as such a situation is an indication that remote transceiver (14) is closer to interior vehicle antenna (26) than to exterior vehicle antenna (22), and it is therefore determined that the remote transceiver (14) is inside or internal to the vehicle (12).

Alternatively, the signal strengths determined by RSSI (34) may be sent from ASIC (36) to a microprocessor (not shown). Such a microprocessor would then determine whether the remote transceiver (14) is inside or outside the vehicle (12) in the same fashion as described above in connection with ASIC (36). Preferably, however, such a determination is made within ASIC (36), which is preferably provided with appropriate "smart" and wake-up capabilities, without the need for an external microprocessor.

It should be noted that interior and exterior antenna (22, 26) may be Low Frequency (LF) antenna, and that first and second signals (24, 28) from interior and exterior vehicle antenna (22, 26) may take the form of a very short or abbreviated message (for example, on the order of 2 to 10 bits), and need not necessarily be secure (i.e., encrypted). In such a fashion, more timely determination of inside/outside detection for remote transceiver (14) may be facilitated. That is, shorter, abbreviated first and second signals (24, 28) less than 10 bits in size reduce the time required to make an inside/outside determination, thereby reducing system latency.

As noted above, while FIG. 1 depicts a single interior antenna (26) and a single exterior antenna (22), multiple interior and exterior antennas could be used. In that regard, multiple exterior antennas (22) can be used to determine a region outside the vehicle where the remote transceiver (14) is located relative to the vehicle (12) (e.g., front, back, driver side, passenger side, front driver side, back driver side, front passenger side, back passenger side, etc.). Such exterior antennas (22) provided at various locations on vehicle (12) transmit signals (24) for receipt by remote transceiver (14). Controller (32) of remote transceiver (14) determines an external location of remote transceiver (14) relative to the vehicle (12) based on comparisons of the received signals strength indications of those various signals (24) from exterior antennas (22).

Such localization of the remote transceiver (14) could be used for the purposes of unlocking a specific door (20), or combination of doors, on the vehicle (12), such as that door or those doors closest to the location of the remote transceiver (14). That is, having determined an outside location of remote transceiver (14) relative to the vehicle (12), using antenna (30), controller (32) could then transmit a signal (not shown) to vehicle transceiver and/or control unit (16) specifically identifying that door or those doors to be unlocked. Such localization could also be used for multiple remote transceiver (14), such as remote transceivers (14) carried by both a vehicle driver and a passenger.

In that regard, it should also be noted that multiple interior antennas (26) can be used to determine a region inside the vehicle passenger area, or "cab," where the remote transceiver (14) is located relative to the vehicle (12) (e.g., front, back, driver side, passenger side, front driver side, back driver side, front passenger side, back passenger side, etc.). Such internal localization is performed in a similar fashion to that described above in connection with external localization.

In that same regard, it should further be noted that RSSI (34) and ASIC (36) are preferably provided with "3D" or vector functionality for the purpose of making the determination of the location of the remote transceiver (14) more reliable. It should be noted, however, that single channel RSSI functionality may also be utilized.

Figure 3:
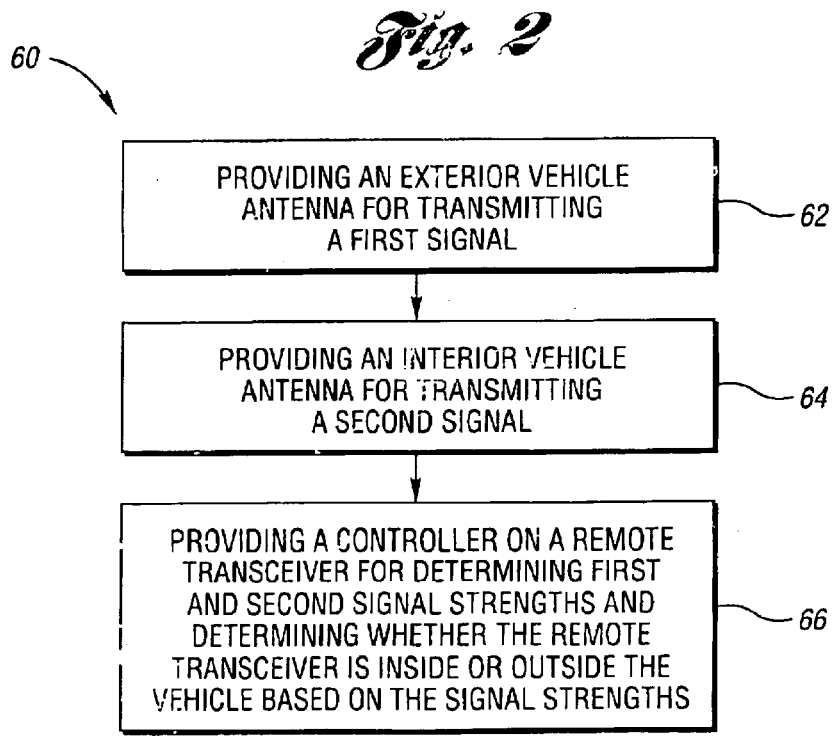
FIG. 3 is a simplified, exemplary flowchart depicting the improved passive entry method of the present invention including inside/outside detection.

Referring next to FIG. 3, a simplified, exemplary flowchart depicting the improved passive entry method of the present invention including inside/outside detection is shown, denoted generally by reference numeral 60. As seen therein, the method (60) is provide for use in a passive entry system for a vehicle, the passive entry system including a remote transceiver, and is for detecting a location of the remote transceiver relative to the vehicle.

The method (60) of the present invention comprises providing (62) an exterior vehicle antenna for use in transmitting a first signal for receipt by the remote transceiver, and providing (64) an interior vehicle antenna for use in transmitting a second signal for receipt by the remote transceiver. The method (60) still further comprises providing (66) a controller on board the remote transceiver for determining a signal strength of the first signal, determining a signal strength of the second signal, and determining whether the remote transceiver is located inside or outside the vehicle based on the signal strengths of the first and second signal.

It should be noted that the simplified flowchart depicted in FIG. 3 is exemplary of the method (60) of the present invention. In that regard, the steps of such method (60) may be executed in sequences other than those shown, including the execution of one or more steps simultaneously.

According to the method (60) of the present invention, as discussed in greater detail above, and with continuing reference to FIGS. 1 and 2, controller (32) preferably includes a Received Signal Strength Indicator (RSSI) (34), thereby making controller (32) capable of determining a signal strength of the first signal (24), and determining a signal strength of the second signal (28). Once again, RSSI (34) is preferably provided as part of an Application Specific Integrated Circuit (ASIC) (36). Preferably, the signal strengths of first and second signals (24, 28) determined by RSSI (34) are compared by ASIC (36) in order to determine if the remote transceiver (14) is inside or outside the vehicle (12) in the manner previously described.

Also according to the method (60) of the present invention, the signal strengths determined by RSSI (34) may alternatively be sent from ASIC (36) to a microprocessor (not shown). Such a microprocessor would then determine whether the remote transceiver (14) is inside or outside the vehicle (12). Preferably, however, such a determination is made within ASIC (36), which is preferably provided with appropriate "smart" and wake-up capabilities, without the need for an external microprocessor.

Still further according to the method (60) of the present invention, interior and exterior antenna (22, 26) may be Low Frequency (LF) antenna, and first and second signals (24, 28) from interior and exterior vehicle antenna (22, 26) may take the form of a very short or abbreviated message (for example, on the order of 2 to 10 bits), and need not necessarily be secure (i.e., encrypted). In such a fashion, more timely determination of inside/outside detection for remote transceiver (14) may be facilitated. That is, shorter, abbreviated first and second signals (24, 28) less than 10 bits in size reduce the time required to make an inside/outside determination, thereby reducing system latency. RSSI (34) and ASIC (36) are also preferably provided with "3D" or vector functionality for the purpose of making the determination of the location of the remote transceiver (14) more reliable. In that regard, however, single channel RSSI functionality may also be utilized.

As is readily apparent from the foregoing description, then, the present invention provides an improved passive entry system and method that uses inside and outside antenna to detect the location of the remote transceiver. In particular, the remote transceiver preferably compares the signal strength of signals from the interior and exterior antenna to determine whether the remote transceiver is inside or outside of the vehicle.

While various embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. Indeed, many alternatives, modifications, and variations will be apparent to those skilled in the art in light of the foregoing description, and the present invention is intended to embrace all such alternatives.

What is claimed is:

1. In a passive entry system for a vehicle, the passive entry system including a remote transceiver, a system for detecting a location of the remote transceiver relative to the vehicle comprising:
   an exterior vehicle antenna for use in transmitting a first signal for receipt by the remote transceiver;
   an interior vehicle antenna for use in transmitting a second signal for receipt by the remote transceiver; and
   a controller on board the remote transceiver for determining a signal strength of the first signal, determining a signal strength of the second signal, and determining whether the remote transceiver is located inside or outside the vehicle based on the signal strengths of the first and second signals;
   wherein the remote transceiver transmits a third signal for use in locking or unlocking a vehicle door based on the determination by the controller whether the remote transceiver is located inside or outside the vehicle.

2. The system of claim 1 wherein the controller determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

3. The system of claim 2 wherein the controller comprises a received signal strength indicator for use in determining the signal strength of the first and second signals transmitted by the exterior and interior vehicle antenna, respectively.

4. The system of claim 1 wherein the controller comprises a received signal strength indicator for use in determining the signal strength of the first and second signals transmitted by the exterior and interior vehicle antenna, respectively.

5. The system of claim 4 wherein the controller further comprises an application specific integrated circuit for determining whether the remote transceiver is located inside or outside the vehicle based on the signal strengths of the first and second signals.

6. The system of claim 5 wherein the application specific integrated circuit determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

7. The system of claim 4 wherein the controller further comprises a microprocessor for determining whether the remote transceiver is located inside or outside the vehicle based on the signal strengths of the first and second signals.

8. The system of claim 7 wherein the microprocessor determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

9. In a passive entry system for a vehicle, the passive entry system including a remote transceiver, a method for detecting a location of the remote transceiver relative to the vehicle comprising:
   transmitting from an exterior vehicle antenna a first signal for receipt by the remote transceiver;

transmitting from an interior vehicle antenna a second signal for receipt by the remote transceiver; and at the remote transceiver, determining a signal strength of the first signal, determining a signal strength of the second signal, and determining whether the remote transceiver is located inside or outside the vehicle based on the signal strengths of the first and second signals;

transmitting from the remote transceiver a third signal for use in locking or unlocking a vehicle door based on the determination whether the remote transceiver is located inside or outside the vehicle.

10. The method of claim 9 wherein the controller determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

11. The method of claim 10 wherein the controller comprises a received signal strength indicator for use in determining the signal strength of the first and second signals transmitted by the exterior and interior vehicle antenna, respectively.

12. The method of claim 9 wherein the controller comprises a received signal strength indicator for use in determining the signal strength of the first and second signals transmitted by the exterior and interior vehicle antenna, respectively.

13. The method of claim 12 wherein the controller further comprises an application specific integrated circuit for determining whether the remote transceiver is located inside or outside the vehicle based on the signal strengths of the first and second signals.

14. The method of claim 13 wherein the application specific integrated circuit determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

15. The method of claim 12 wherein the controller further comprises a microprocessor for determining whether the remote transceiver is located inside or outside the vehicle based on the signal strengths of the first and second signals.

16. The method of claim 15 wherein the microprocessor determines that the remote transceiver is located outside the vehicle if the strength of the first signal transmitted by the exterior vehicle antenna is greater than the strength of the second signal transmitted by the interior vehicle antenna, and determines that the remote transceiver is located inside the vehicle if the strength of the second signal transmitted by the interior vehicle antenna is greater than the strength of the first signal transmitted by the exterior vehicle antenna.

* * * * *